United States Patent
Nakazono

(10) Patent No.: US 9,531,225 B2
(45) Date of Patent: Dec. 27, 2016

(54) ELECTRIC ROTATING MACHINE

(71) Applicant: DENSO CORPORATION, Kariya, Aichi-pref. (JP)

(72) Inventor: Junichi Nakazono, Okazaki (JP)

(73) Assignee: DENSO CORPORATION, Kariya (JP)

( * ) Notice: Subject to any disclaimer, the term of this patent is extended or adjusted under 35 U.S.C. 154(b) by 167 days.

(21) Appl. No.: 14/030,438

(22) Filed: Sep. 18, 2013

(65) Prior Publication Data
US 2014/0084729 A1    Mar. 27, 2014

(30) Foreign Application Priority Data
Sep. 27, 2012 (JP) ................... 2012-214377

(51) Int. Cl.
*H02K 1/27* (2006.01)

(52) U.S. Cl.
CPC ............. *H02K 1/27* (2013.01); *H02K 1/2766* (2013.01)

(58) Field of Classification Search
CPC ............................ H02K 1/27; Y10T 29/49012
USPC .................. 310/156.53, 156.56, 156.72, 156.83, 310/156.01, 216.049, 156.047
See application file for complete search history.

(56) References Cited

U.S. PATENT DOCUMENTS

| | | | |
|---|---|---|---|
| 7,170,209 B2 * | 1/2007 | Araki | H02K 1/2766 29/598 |
| 2005/0140238 A1 | 6/2005 | Yokochi et al. | |
| 2010/0187944 A1 * | 7/2010 | Ossenkopp | H02K 1/28 310/216.049 |
| 2011/0278977 A1 * | 11/2011 | Utaka | 310/156.53 |
| 2011/0278981 A1 | 11/2011 | Utaka | |

FOREIGN PATENT DOCUMENTS

| | | |
|---|---|---|
| JP | 2005-192288 | 7/2005 |
| JP | 2006-254599 | 9/2006 |
| JP | 2011-41446 | 2/2011 |
| JP | 2011-147310 | 7/2011 |
| JP | 2011-239612 | 11/2011 |
| JP | 2011-239615 | 11/2011 |
| JP | 2011-259688 | 12/2011 |

OTHER PUBLICATIONS

Notification of Reasons for Rejection issued in JP 2012-214377 dated Nov. 17, 2015 (with partial English translation).

* cited by examiner

*Primary Examiner* — Naishadh Desai
(74) *Attorney, Agent, or Firm* — Nixon & Vanderhye P.C.

(57) ABSTRACT

The electric rotating machine includes a stator having an inner hole, a rotor disposed in the inner hole of the stator with a gap with an inner periphery of the stator and formed with magnet housing holes each housing a permanent magnet as a magnetic pole embedded in the outer periphery of the rotor, and a shaft pressure-inserted into a center hole of the rotor. The rotor includes, for each adjacent two of the magnet housing holes, a beam portion formed radially outside the magnet housing holes, a projecting portion projecting radially inward to define the center hole, an extension portion formed radially outside the projecting portion and radially outside the magnet holes, and a plate-shaped bridge portion connecting the beam portion and the extension portion.

6 Claims, 1 Drawing Sheet

ELECTRIC ROTATING MACHINE

This application claims priority to Japanese Patent Application No. 2012-214377 filed on Sep. 27, 2012, the entire contents of which are hereby incorporated by reference.

BACKGROUND OF THE INVENTION

1. Field of the Invention

The present invention relates to an electric rotating machine.

2. Description of Related Art

There is known an electric rotating machine having a structure in which the outer peripheral surface of a fitting portion of a shaft fitted into a center hole a core of a rotor is provided with axially extending convex lines formed by knurling, and the circumferential wall surface of the center hole of the core is formed with an engaging portion which engage with the convex lines to control the mutual circumferential rotation between the shaft and the core. For example, refer to Japanese Patent Application Laid-open No. 2011-239612.

Generally, the core of the rotor of a common electric rotating machine is made by laminating electromagnetic steel sheets having a high hardness. Accordingly, the core is harder than the shaft. Therefore, there is a concern that the shaft cannot be pressure-inserted into the center hole of the core with a sufficiently high insertion accuracy, and chips occur during the insertion. In this regard, the foregoing knurled shaft structure as described in the above patent document can provide a sufficiently high insertion accuracy of the shaft and lessen the stress in the circumferential direction, because there are formed relief spaces for the projections of the engaging portion of the core between each adjacent two of the convex lines of the shaft, and there are formed relief spaces for the concave lines of the shaft between each adjacent two of the projections of the engaging portion of the core.

However, the above knurled shaft structure still involves the problem that a large stress occurs in the radial direction when the shaft is pressure-inserted into the center hole of the core.

SUMMARY

An exemplary embodiment provides an electric rotating machine including:

a stator having an inner hole;

a rotor disposed in the inner hole of the stator with a gap with an inner periphery of the stator, and formed with magnet housing holes each housing a permanent magnet as a magnetic pole embedded in an outer periphery of the rotor; and a shaft pressure-inserted into a center hole of the rotor, wherein the rotor includes, for each adjacent two of the magnet housing holes, a beam portion formed radially outside the magnet housing holes, a projecting portion projecting radially inward to define the center hole, an extension portion formed radially outside the projecting portion and radially outside the magnet holes, and a plate-shaped bridge portion connecting the beam portion and the extension portion.

According to the exemplary embodiment, there is provided an electric rotating machine including a rotor having high resistance to centrifugal force.

Other advantages and features of the invention will become apparent from the following description including the drawings and claims.

PREFERRED EMBODIMENTS OF THE INVENTION

Figure 1:
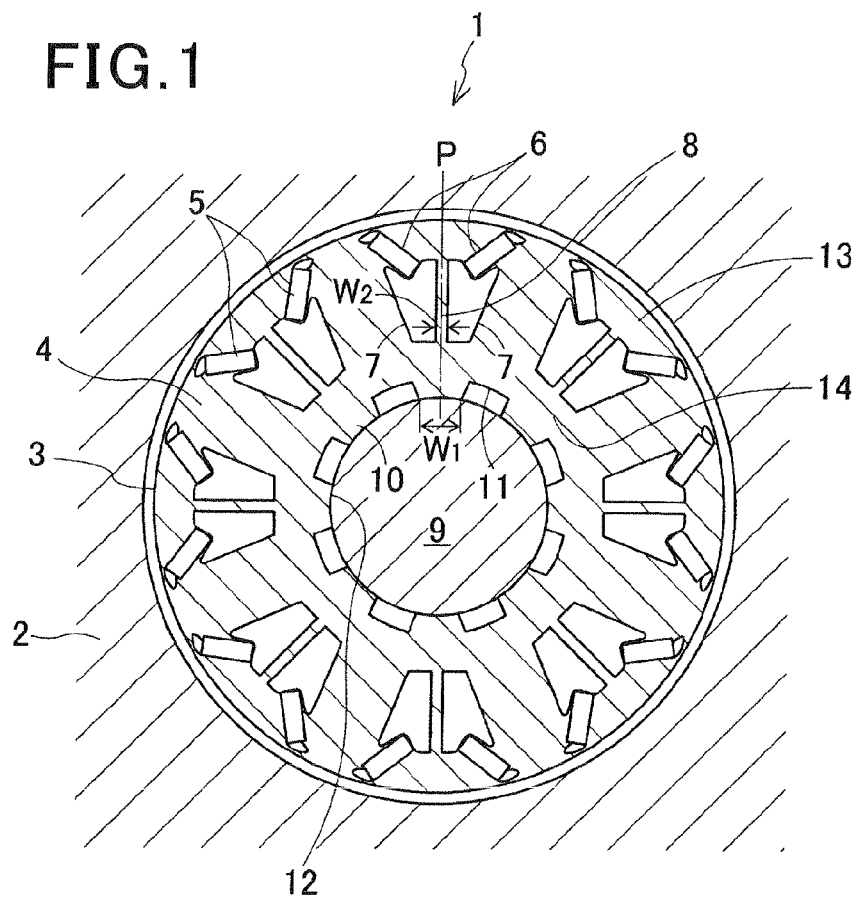
FIG. 1 is a partial cross-sectional view of an electric rotating machine according to an embodiment of the invention.

FIG. 1 is a partial cross-sectional view of an electric rotating machine 1 according to an embodiment of the invention, which is used as a vehicle-mounted motor. The electric rotating machine 1 includes a stator 2, a rotor 3, permanent magnets 5 and a shaft 9.

The stator 2 includes a stator coil (not shown) wound thereon. The rotor 3 is rotatably supported by the shaft 9 with a gap with the inner peripheral surface of an inner hole of the stator 2.

The rotor 3 include a rotor core 4 made by laminating a plurality of electromagnetic steel sheets punched into such a shape that the rotor core 4 has magnet housing holes 6, hollow portions 7 and a center hole 12.

A permanent magnet 5 is embedded in each of the magnet housing holes 6. The permanent magnets 5 are embedded in the magnet housing holes 6 such that, at each of a plurality of (eight in this embodiment) magnetic poles, two permanent magnets 5 depart radially outward in a V-shape from their pole center axis P.

The rotor 3 is formed with, for each of the magnetic poles, a projecting portion 10 which projects radially inward and is located at a position through which the pole center axis P passes. The projecting portion 10 has a roughly trapezoidal shape in cross-section. The cross section of the center hole 12 is a circle including the top sides of the projecting portions 10. The width W1 of the top side of the projecting portion 10 is made smaller than the circumference of the center hole 12 divided by the number of the magnetic poles so that a concave portion 11 is formed between each adjacent two of the projecting portions 10.

The hollow portions 7 are located between the magnet housing holes 6 and the projecting portions 10 for the respective magnet housing holes 6 such that each adjacent two of the hollow portions 7 are symmetrical with respect to the pole center axis P. The hollow portions 7 are for increasing the magnetic resistance at the pole center portions to thereby increase the reluctance torque.

A bridge 8 which extends along the pole center axis P is provided. The bridge portion 8 separates the adjacent magnet housing holes 6 and the adjacent hollow portions 7 plane-symmetrically with respect to the pole center axis P. A beam portion 13 is formed between the radially outside of the adjacent magnet housing. The bridge portion 8 provides mechanical connection between the beam portion 13 and the projecting portion 10. That is, one end of the bridge portion 8 is connected to the beam portion 13, and the other end of the bridge portion 8 is connected to an extension portion 14 formed radially outward of the projecting portion 10. It is preferable that the portion of the connection between the extension portion 14 and the other end of the bridge 8 is located at the center of the top side (the width W1) of the projecting portion 10. However, the position of the portion of the connection may be deviated within the area in which the circumferential position of the center of the bridge portion 8 is within the circumferential positions of the laterals sides of the projecting portion 10. The center of the longitudinal width W2 of the bridge portion 8 may be located at any position within the width W1 of the top side of the projecting portion 10 (between both the lateral sides of the projecting portion 10). The bridge portion 8 serves to reduce the radially outward expansion of the beam portion 13 due to the centrifugal force while the rotor 3 rotates. Accordingly, the gap between the beam portion 13 and the inner circumference of the stator 2 can be kept at a certain value to provide the needed magnetic effect.

Figure 2:
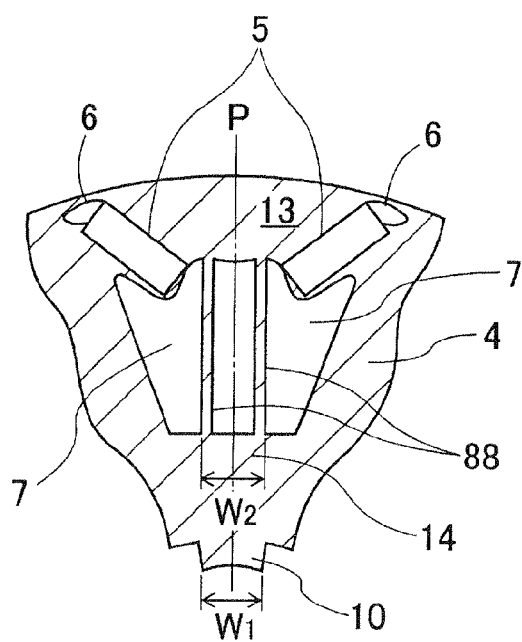
FIG. 2 is a magnified partial cross-sectional view of a modification of the electric rotating machine according to the embodiment of the invention.

As shown in FIG. 1, the bridge portion 8 is single plate-shaped. However, the bridge portion 8 may be replaced by a bridge portion 88 which is double-plate shaped whose longitudinal axis coincides with the pole center axis P as shown in FIG. 2. Further, the bridge portion may be three plate-shaped.

The laminated rotor core 4 is fixed by the shaft 9 pressure-inserted into the center hole 12 at its pressure-insertion portion. The pressure-insertion portion of the shaft 9 is incised with axially extending grooves. Since the shaft 9 is inserted into the center hole 12 while chipping the top sides of the projecting portions 10, the bonding between the rotor core 4 and the shaft 9 can be secured.

The compression stress due to the force at the time of pressure-inserting the shaft 9 into the center hole 12 of the rotor core 4 remains in the projecting portions 10 and the bridge portions 8 or 88. To transmit this compression stress to the bridge portions 8 or 88 reliably and effectively, it is preferable that the center of the width W2 of the bridge portion 8 or 88 coincides with the center of the width W1 of the top side of the projecting portion 10. Further, to effectively reduce the expansion of the beam portion 13, it is preferable that the pole center axis P in the beam portion 13 coincides with the center of the width W2 of the bridge portion 8 or 88.

As described above, the vehicle-use electric rotating machine 1 according to the embodiment of the invention includes the beam portions 13 located radially outward of the magnet housing holes 6 housing the permanent magnets 5, the projecting portions 10 defining the center hole 12, the extension portions 14 located radially outward of the projecting portions 10 and the plate-shaped bridge portions 8 or 88 connecting the beam portions 13 and the extension portions 14. This structure enables effectively applying the compression stress generated by the pressure insertion of the shaft 9 into the center hole 12 of the rotor core 4 to the bridge portions 8 or 88, to thereby reduce the tensile stress of the bridge portions 8 or 88 due to the centrifugal force of the rotor 3, as a result of which the bridges 8 or 88 exhibit high strength. Further, since the permanent magnet 5 is constituted of a pair of permanent magnets disposed in a V-shape so as to depart from each other toward radially outward, the advantageous effect of the bridge portion 8 or 88 is increased. The hollow portions 7 are located between the magnet housing holes 6 and the projecting portions 10. This makes it possible to increase the torque and improve the strength against the centrifugal force of the rotor 3. The center of the width W2 of the bridge portion 8 or 88 coincides with the center W1 of the top side of the projecting portion 10. This makes it possible to reliably and effectively transmit the compression stress generated in the projecting portion 10 to the bridge portion 8 or 88. The pole center axis P in the beam portion 13 coincides with the center of the width W2 of the bridge 8 or 88. This makes it possible to effectively reduce the expansion of the beam portion 13. The pole center axis P in the beam portion 1 is within the width W1 between the lateral sides of the projecting portion 10. This makes it possible to reliably transmit the compression force generated in the projecting portion 10 to the bridge portion 8 or 88.

The above explained preferred embodiments are exemplary of the invention of the present application which is described solely by the claims appended below. It should be understood that modifications of the preferred embodiments may be made as would occur to one of skill in the art.

What is claimed is:

1. An electric rotating machine comprising:
   a stator having an inner hole;
   a rotor disposed in the inner hole of the stator with a gap with an inner periphery of the stator, and formed with magnet housing holes each housing a permanent magnet as a magnetic pole embedded in an outer periphery of the rotor; and
   a shaft pressure-inserted into a center hole of the rotor, wherein
   the rotor includes, for each adjacent two of the magnet housing holes,
   a beam portion formed radially outside the magnet housing holes,
   a projecting portion projecting radially inward to define the center hole,
   an extension portion formed radially outside the projecting portion and radially inside the magnet holes,
   a plate-shaped bridge portion connecting the beam portion and the extension portion, and
   a concave portion formed between adjacent projecting portions,
   wherein a hollow portion is formed between each of the magnet housing holes and a corresponding one of the projecting portions; and
   wherein the plate-shaped bridge portion is on an extension of a center line of the projecting portion, and the hollow portion is immediately radially outside the projecting portion.

2. The electric rotating machine according to claim 1, wherein the permanent magnet as a magnetic pole is constituted of a pair of permanent magnets disposed in a V-shape so as to depart from each other toward radially outward forming a pole center axis therebetween.

3. The electric rotating machine according to claim 2, wherein the projecting portion has a trapezoidal shape in cross section, and a center of a longitudinal width of the bridge portion coincides with a center between lateral sides of the projecting portion.

4. The electric rotating machine according to claim 3, wherein the pole center axis in the beam portion coincides the center of the bridge portion.

5. The electric rotating machine according to claim 4, wherein the pole center axis in the beam portion is between the lateral sides the projecting portion.

6. The electric rotating machine according to claim 1, wherein the projecting portion has a trapezoidal shape in cross section.

* * * * *